March 3, 1953  H. S. STARBUCK  2,630,551
TESTING DEVICE FOR FLUORESCENT TUBE FIXTURES
Filed Feb. 18, 1950
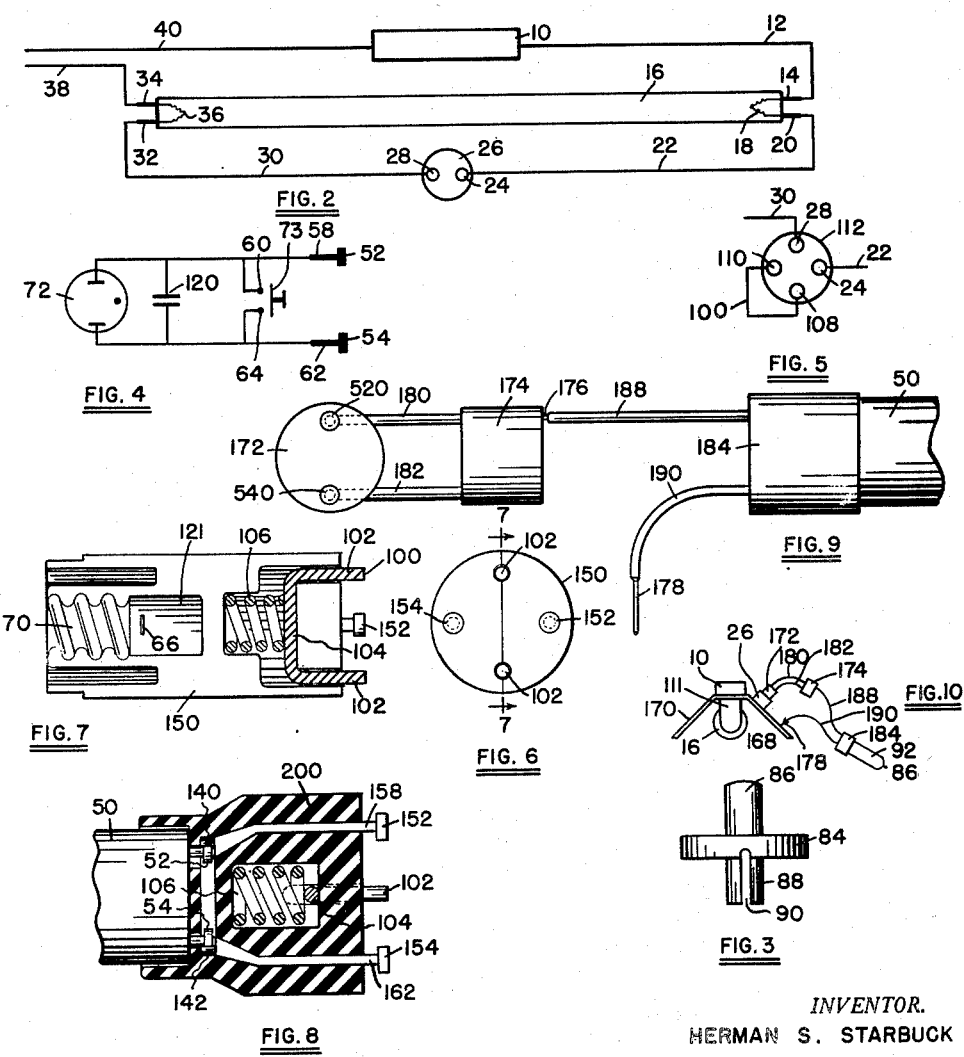
INVENTOR.
HERMAN S. STARBUCK Patented Mar. 3, 1953

2,630,551

UNITED STATES PATENT OFFICE 2,630,551

TESTING DEVICE FOR FLUORESCENT TUBE FIXTURES

Herman S. Starbuck, Cincinnati, Ohio, assignor to Continental Electric Equipment Co., Ludlow, Ky., a corporation of Ohio Application February 18, 1950, Serial No. 145,018

3 Claims. (Cl. 315—367)

This invention relates to a testing device for fluorescent tube fixtures, and more particularly to a device for testing the various circuits of such fixtures and the condition of a tube or tubes in the circuit.

An object of the invention is to provide a compact, highly efficient, foolproof, inexpensive, portable visual indicating testing device for enabling the ballast, tube and starter elements of a typical fluorescent fixture circuit to be tested.

A further primary object of the present invention is to provide a compact device which will enable the user thereof to quickly and positively diagnose the exact source of failure in a fluorescent fixture circuit without necessitating removal of the fluorescent tube or having direct access to the ballast.

Another object of the invention is to provide a visual indicating testing device which is dimensioned to be received within a starter socket upon removal of the conventional starter element from a fluorescent tube circuit, thereby precluding the necessity, in most instances, of removing the fluorescent tubes from the fixtures and of eliminating the necessity of having direct access to the ballast of the fluorescent fixture being tested.

Still a further object of the invention is to provide a visual indicating testing device having the hereinabove described characteristics which will enable the user thereof to, without removing the device from the circuit sequentially test the ballast, tube and starter of a fluorescent fixture.

Another object of the invention is to provide a device having the hereinabove described characteristics which will also indicate the existence of a grounded condition of the ballast windings with the ballast housing.

Still another object of the invention is to provide a testing device which is universally adaptable for testing the component elements of various styles, types and sizes of fluorescent tube fixtures.

A further object of the invention is to provide a testing device which may be utilized for testing various sized fluorescent tubes and their corresponding starter elements, whether they be of the two or four prong type.

These and other objects are attained by the means described herein and as disclosed in the accompanying drawings, in which:

Fig. 1 is a longitudinal section through a typical testing device embodying the teachings of the present invention.

Fig. 2 is a diagrammatic sketch of a typical fluorescent fixture circuit diagram of the type which the instant device has been developed to test.

Fig. 3 is a side view of an actuator button comprising a detail of the device of Fig. 1.

Fig. 4 is a diagrammatic view of the electrical circuit of the tester embodying the teachings of the present invention.

Fig. 5 is a diagrammatic view of a four-prong type starter socket, and as such is a modification of the two-prong starter element 26 of Fig. 2.

Fig. 6 is a bottom end view of the base portion only of a modified type of testing device of the type adapted to accommodate both two- and four-prong starter elements.

Fig. 7 is a view taken on line 7—7 of Fig. 6.

Fig. 8 is a sectional view of an adapter comprising a detail of the present invention.

Fig. 9 is a schematic view of an adapter assembly useful in testing for grounded conditions in the ballast circuit.

Fig. 10 is a diagrammatic view of the adapter assembly of Fig. 9 operatively associated with a fluorescent fixture.

With reference now to Fig. 2, it will be noted that a typical fluorescent fixture circuit comprises a ballast 10 which is connected by conductor 12 to prong 14 of a fluorescent tube denoted generally by the numeral 16. A so-called heater element or filament 18 is series connected across tube-prongs 14 and 20, prong 20 being connected by conductor 22 to contact element 24 of a starter socket denoted generally by the numeral 26. Contact element 28 of the starter socket is connected by conductor 30 to tube-prong 32 which is series connected with tube-prong 34 by means of heater element or filament 36. It will be understood that a starter element, not illustrated, is receivable in starter socket 26 for normally completing the electrical circuit across contacts 24 and 28. Prong 34 may be connected to a suitable source of alternating current by conductor 38, it being understood that one side of ballast 10 is connected to the other side of said source of alternating current by conductor 40.

Heretofore it has been the common practice to discard a fluorescent tube whenever it fails to light, or when it lights but intermittently, that is, blinks or flashes on and off. In many instances good tubes were thus discarded when the real fault was with the starter element and/or the ballast.

The starter element in all fluorescent fixtures is comparatively accessible, wherefore the present device contemplates removal of the starter element from the fluorescent fixture to be tested preparatory to use of my testing device.

With reference now to Fig. 1, it will be observed that the testing device comprises a base portion 50 dimensioned to be received within the starter socket 26 from which a starter element has been removed. A pair of contact elements 52 and 54 project outwardly from bottom face 56 in such a manner as to co-operate with the prong receptive contact elements 24 and 28 of the starter socket. Contact element 52 is secured to the free outer end of conductor 58, which terminates at its inner end in a contact point 60. Contact element 54 is secured to the free end of conductor 62, the inner end of which terminates in a contact point 64.

Electrodes 66 and 68 of a socket 70 may be connected respectively to conductors 58 and 62. A neon flash tube 72 is operatively receivable within socket 70, as illustrated.

A substantially U-shaped shorting bar, denoted generally by the numeral 73, which may include a pair of laterally spaced side legs 74 and 76 interconnected at their upper ends as at 78 is provided, wherein the free outer end of each of legs 74 and 76 terminates in a contact point 80.

The shorting bar is normally disposed in a non-operative position for precluding accidental or unintentional contact between contact points 80 and their respective fixed contact points 60 and 64, by means of a spring 82. If desired, spring 82 may be interposed between the upper end of glow tube 72 and the lower face of flange 84 of an actuator button 86.

With reference to Figs. 1 and 3, it will be noted that a stub shaft 88 projects downwardly from the lower face of flange 84, said stub shaft being provided with a slot 90 in which the upper leg 78 of the shorting bar is received. Stub shaft 88 projects into the upper end of spring 82, thereby positioning it in desired axial relationship with the outer end of glow tube 72.

Preferably a transparent housing, denoted generally by the numeral 92, is disposed over those portions of the device remote from base 50.

The operation of the device is as follows: After the starter has been removed from the fluorescent fixture and replaced by the device of Fig. 1, electrical energy is supplied to the fixture through conductors 38 and 40. If glow lamp 72 lights up, it is a positive visual indication that ballast 10, filaments 18 and 36 and therefore the ballast circuit, is in good condition.

In order now to test fluorescent tube 16, as to its light emission condition, actuator button 86 is depressed for causing contact points 80 to engage their complementary contact points 60 and 64. When the actuator button 86 is depressed, the heater circuit to tube 16 is completed and heater elements 18 and 36 are energized thus resulting in vaporizing the mercury in the tube. If the actuator button be now slowly released, a voltage in excess of the line voltage will be impressed across the heater elements due to the inherent, well-known characteristics of the ballast. If the tube is good, this excess voltage will cause an arc to strike across the tube and heater elements 18 and 36 become respectively an anode and cathode.

If the fluorescent tube 16 should light, it indicates that the starter was defective. However, if the above procedure fails to cause the tube to light it should be removed and replaced with a new tube. The testing device may then be removed from socket 26 and the original starter replaced. If the new tube fails to light, a new starter should be installed.

In certain installations, particularly in older installations, the ends of the fluorescent tubes are provided with two prongs, as in the newer tubes, however the starter elements have four rather than two prongs.

In order to provide a maximum utility, I have incorporated a retractable shorting bar, 100, see Fig. 7, which renders my tester truly universal, since the retractable characteristics of this shorting bar will enable it to be displaced, to a non-operative position, when the testing device is used with a two-prong starter. When a four-prong starter is being checked, the shorting bar will become effective to complete a tube operating circuit through the four element starter socket.

Preferably, though not necessarily, shorting bar 100 may be fabricated from a single length of conducting material formed to provide a pair of laterally spaced legs 102 interconnected by leg 104.

A spring 106 may be utilized for normally and yieldingly urging shorting bar 100 forwardly to the fully extended position indicated in Fig. 7. It may be noted that the device of Fig. 6 comprises complemental halves suitably secured together by means of a suitable adhesive, or the like, along a plane defined by line 7—7.

With reference now to Fig. 5, it will be observed that the function of shorting bar 100 is to close a circuit between contact elements 108 and 110 of the four element starter socket denoted generally by the numeral 112. Contact elements 24 and 28 correspond with similar elements appearing in Fig. 2 of the two element socket 26. The numerals 152 and 154 of Fig. 6 denote contact elements similar in all respects to those denoted by the numerals 52 and 54 of Fig. 1.

As a practical matter, it will be noted that four-prong starter elements are found only in the older type fixtures using 100 watt tubes, and since the dimensional characteristics of the starter sockets of 100 watt tubes are greater than those of the 15 to 40 watt tubes, the base portion 150 has been dimensioned for reception within starter socket 112, rather than 26. However, all other details of the tester, except the base size, may be the same.

In the preferred embodiment of the invention a capacitor 120, which may be located within recess 121, is disposed in series across the upper ends of conductors 58 and 62, the function of the capacitor being to protect points 80, 60 and 64 from excessive arcing incident to manipulation of actuator button 86 for effecting a short circuit in order to simulate the action of a starter in illuminating tube 16, particularly when testing 100 watt tubes.

In the preferred operation of the device, actuator button 86 should be slowly withdrawn for the purpose of inducing an arc incident to separation of contact points 80 from their respective contact points 60 and 64, such arcing being essential in order to simulate the operating characteristics of a conventional starter incident to operation of tube 16. In this connection I have observed that uniformly satisfactory results are obtained when contact points 80, 60 and 64 are fabricated from so-called "pure silver." I have been unable to obtain uniformly satisfactory results when the points have been fabricated from other materials, such as tungsten, and the like, and I do not profess to know why the use of pure silver points insures the desired results, whereas other types of points leave much to be desired.

In Fig. 8 I have illustrated an adapter socket 200 for two and four element starter sockets of the 100 watt tube type which will enable the device of Fig. 1, the base 50 of which has, as heretofore explained, having been dimensioned to be received within the two element starter socket 26, of Fig. 2, of a 15 to 40 watt tube. Contact elements 152 and 154 are connected by conductors 158 and 162 to spring clip contact elements 140 and 142 which, as illustrated, are constructed and arranged to be engaged by contact elements 52 and 54, respectively, of the tester of Fig. 1.

The diameter of that end of the adapter from which contact elements 152 and 154 project is of a dimension to be received within starter socket 112, whereas the other end of the adapter has been dimensioned to receive body portion 50 of the unit of Fig. 1.

It will be observed that a shorting bar 100 is associated with the adapter wherein the operating characteristics of said shorting bar are exactly as explained with reference to the device of Fig. 7.

With reference now to Figs. 9 and 10, it will be observed that the tester device may be utilized to indicate a shorted or grounded condition of the ballast winding with the ballast housing, which housing usually comprises a metallic box-like structure which houses and acts as a protective shield for the ballast winding and the sealing compound in which it is imbedded.

As illustrated diagrammatically in Fig. 10, ballast unit 10 may be conventionally secured directly to top member 168 of the fixture housing denoted generally by the numeral 170, such fixture housings are usually fabricated from a conducting material, such as sheet metal. The numeral 111 denotes a tube socket.

It is not uncommon for the windings of a ballast unit to become grounded or electrically connected to the ballast housing. Quite often this condition does not too seriously impair the operating characteristics of the tube although it places an undue burden on the starter since the grounded ballast will not deliver its full rated energy surge incident to the starting operation. As a result the starter will be overworked and the tube may flash on and off several times before lighting up properly.

The numeral 172 denotes a plug member provided with contact elements 520 and 540. The plug is dimensioned to be received within a starter socket, such as 26 or 112 in the same manner in which base 50 is received in such sockets.

The numeral 174 denotes a connector member which preferably is provided with a pair of jacks (not illustrated) with which test probes 176 and 178 are releasably and selectively receivable. Each of said jacks is connected to a contact element 520 or 540 by means of conductors 180 and 182, respectively.

The numeral 184 denotes a socket in which the end of base 50 of the device of Fig. 1 may be releasably received, it being understood that this socket contains suitable contact members which are engagable by elements 52 and 54 which are thereby connected to conductors 188 and 190, the free outer ends of which terminate in plug or probe members 176 and 178, respectively.

During those periods of time when test probes 176 and 178 are both operatively connected to connector member 174, Fig. 9, the tester will operate in the same manner as when the end of base member 50 is received directly in a starter socket. When it becomes necessary or desirable to check the ballast for a ground between various of its internal windings and the housing or casing, the following procedure may be followed: One of the test probes, such as, by way of example, 178, may be withdrawn from connector 174, thereby opening or breaking the electrical circuit of Fig. 2 at, say, contact element 28. Probe 178 may then be brought in contact with a portion of fixture 170 to which the ballast housing is bolted or otherwise securely, though releasably attached. If lamp 72 fails to glow, it is a positive indication that an electrical circuit is not being completed through the ballast housing, thence through the ballast windings and back to the source of supply.

If the tube should glow it is a positive indication that the electrical circuit is being completed through housing 10 rather than through conductors 12 and 40 from which the housing is normally insulated.

However, if the glow tube should fail to light, then probe 178 may be reconnected to connector 174, and probe 176 disconnected for testing the other side of the ballast circuit, by touching test probe 176 against some portion of fixture 170 for repeating the test made with probe 178.

It should be understood that the illustrated structural details of the testing device are exemplary, rather than restrictive. If desired, plug member 172 may be provided with the test probe engaging jack members thereby eliminating the need for connector member 174, conductors 180 and 182. Other modifications will also become apparent, which will enable the user of the tester to selectively break the electrical circuit to the glow tube, as hereinabove indicated, for testing the ballast.

From the foregoing, it will be noted that I have provided a highly efficient method and means for quickly testing the circuits of a fluorescent tube fixture.

It shall be understood that various changes and modifications in the structural details of the device may be made, within the scope of the appended claims, without departing from the spirit of the invention.

What is claimed is:

1. A portable device for testing the ballast, tube, starter and the circuit of a fluorescent fixture containing the same, said device comprising a substantially solid plug so dimensioned as to be received in the starter socket of a fluorescent tube circuit, conductors in the plug terminating outwardly of one end thereof in prongs adapted to engage complementary contact members in the starter socket, and at their other ends terminating in spaced contacts, a glow lamp socket in the end of the plug opposite the prongs, a glow lamp in the socket and in electrical connection with the conductors, an elongated hollow transparent housing attached at one end to the plug and enclosing the glow lamp, the other end of the housing having a manually operable means projecting outwardly therefrom, switch means engaging the manually operable means and adapted to engage the contacts in the plug, and resilient means normally urging the switch means away from the contacts in the plug, the resilient means being in the form of a coil spring and one end thereof being constantly in engagement with an end portion of the glow lamp and the other end thereof being in engagement with the manually operable means.

2. A device as defined in and by claim 1 wherein the switch means is substantially U-shaped and the free ends of the same constitute contacts which are adapted to engage and disengage the contacts in the plug.

3. A device as defined in and by claim 1 wherein the manually operable means is in the form of a button having a portion thereof that extends outwardly from the end of the transparent housing and an enlarged portion positioned interiorly of the end of the housing which the other end of the coil spring engages, and which button serves to support and actuate the switch means.

HERMAN S. STARBUCK.

REFERENCES CITED

The following references are of record in the file of this patent:

UNITED STATES PATENTS

| Number | Name | Date |
| --- | --- | --- |
| Re. 22,503 | Campbell | June 27, 1944 |
| 2,358,352 | Sherwood | Sept. 19, 1944 |
| 2,450,153 | Moore | Sept. 28, 1948 |